United States Patent [19]

Puig

[11] 3,826,875

[45] July 30, 1974

[54] AUTOMATIC SECURITY COMMUNICATIONS SYSTEM

[76] Inventor: Antonio A. Puig, 7737 Riverdale Rd., No. 204, New Carrolton, Md. 20784

[22] Filed: June 14, 1973

[21] Appl. No.: 370,029

[52] U.S. Cl. .................................. 179/37, 179/2 A

[51] Int. Cl. .......................................... H04m 11/02

[58] Field of Search....... 179/2 A, 2 R, 18 AD, 1 H, 179/18 BF, 18 AA, 37

[56] References Cited

UNITED STATES PATENTS

| | | | |
|---|---|---|---|
| 3,636,268 | 1/1972 | Stiles et al. | 179/37 |
| 3,668,331 | 6/1972 | Warner | 179/37 |
| 3,728,493 | 4/1973 | Ter Veen | 179/1 H |
| 3,736,383 | 5/1973 | Le Baron | 179/18 DA |

*Primary Examiner*—Kathleen H. Claffy
*Assistant Examiner*—Tommy Chin
*Attorney, Agent, or Firm*—Robert I. Lainof

[57] ABSTRACT

An automatic communication system adapted to provide security communications within an apartment building is provided to include a plurality of time delay circuits to automatically discontinue the ringing of an unanswered phone and to terminate the call when the receiver is not hung up.

3 Claims, 3 Drawing Figures

AUTOMATIC SECURITY COMMUNICATIONS SYSTEM

Figure 1:
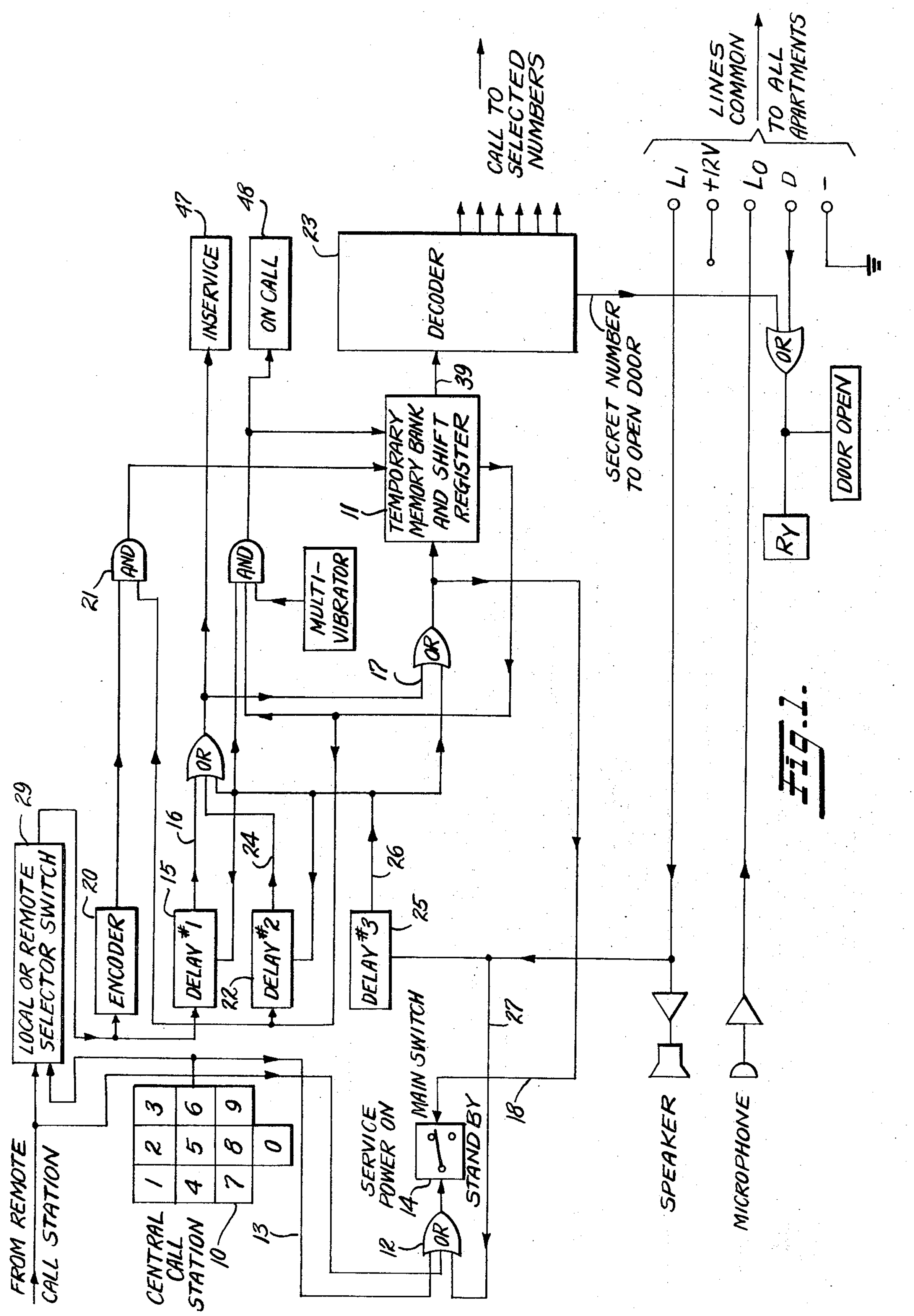

The present invention relates to an automatic communication system designed to provide security communications within an apartment building using digital call principles and time delay based logic circuitry.

In this invention, a central call station including a multiple action selector, such as a pushbutton panel or a dial, is positioned in an entrance area, such as a hallway or a lobby, where it is operated by a calling party in order that an apartment resident will elect to operate an electric lock on an entrance door. When one starts to use the call station a main switch is actuated to shift the system from standby to service status. This main switch is part of a first time delay circuit which permits the calling party to complete the placing of the call within the time allocated by the circuit as by promptly operating selected pushbuttons in proper sequence as is common in placing calls. However, if the call is not promptly completed, the system automatically returns, via the main switch, to standby status, ready to receive other calls.

If the call selection is completed within the allocated time, a second time delay circuit is completed, this circuit including an alarm positioned at the remote receiver selected by the caller. If the alarm of the remote receiver is answered, as by the apartment resident lifting the receiver within the time allocated by the second time delay, then a third time delay circuit is completed, this circuit including an open line so that the calling party can identify himself and a conversation can take place within the time allowed.

When the time limit set by the third time delay circuit has expired, the entire system is returned to its standby position, ready to receive additional calls from calling parties at the central call station to any selected apartment unit within the building.

As will be evident, the system described is particularly adapted to permit callers to identify themselves to the occupant of any selected apartment unit and hold a brief communication with him, whereupon this occupant can elect to operate a separate circuit opening a door in the calling area to permit access to the apartment area of the building.

In conventional systems providing such communication, the inadvertent failure of the parties to hang up properly functions to tie up the system. Thus, if the caller does not hang up, the alarm will keep ringing, which could be a nuisance. Correspondingly, if the party called should fail to hang up, no one else enterring the building could use the system. As a result, conventional systems of the type under consideration must have a separate buzzer in the lobby area for each apartment unit which is expensive and bulky. It also enables pranksters to operate many buttons at the same time creating a nuisance for the many parties who must separately answer their phones when there is no call to be completed. In this invention, only one receiver can be contacted at a time, and a multiple action selector must be used to accomplish the purpose.

While the communication system of this invention may include ancillary features, such as means enabling the party called to recycle the third time delay circuit, or a special call number to directly unlock the door, the basic system does not require such ancillary features.

Figure 2A:
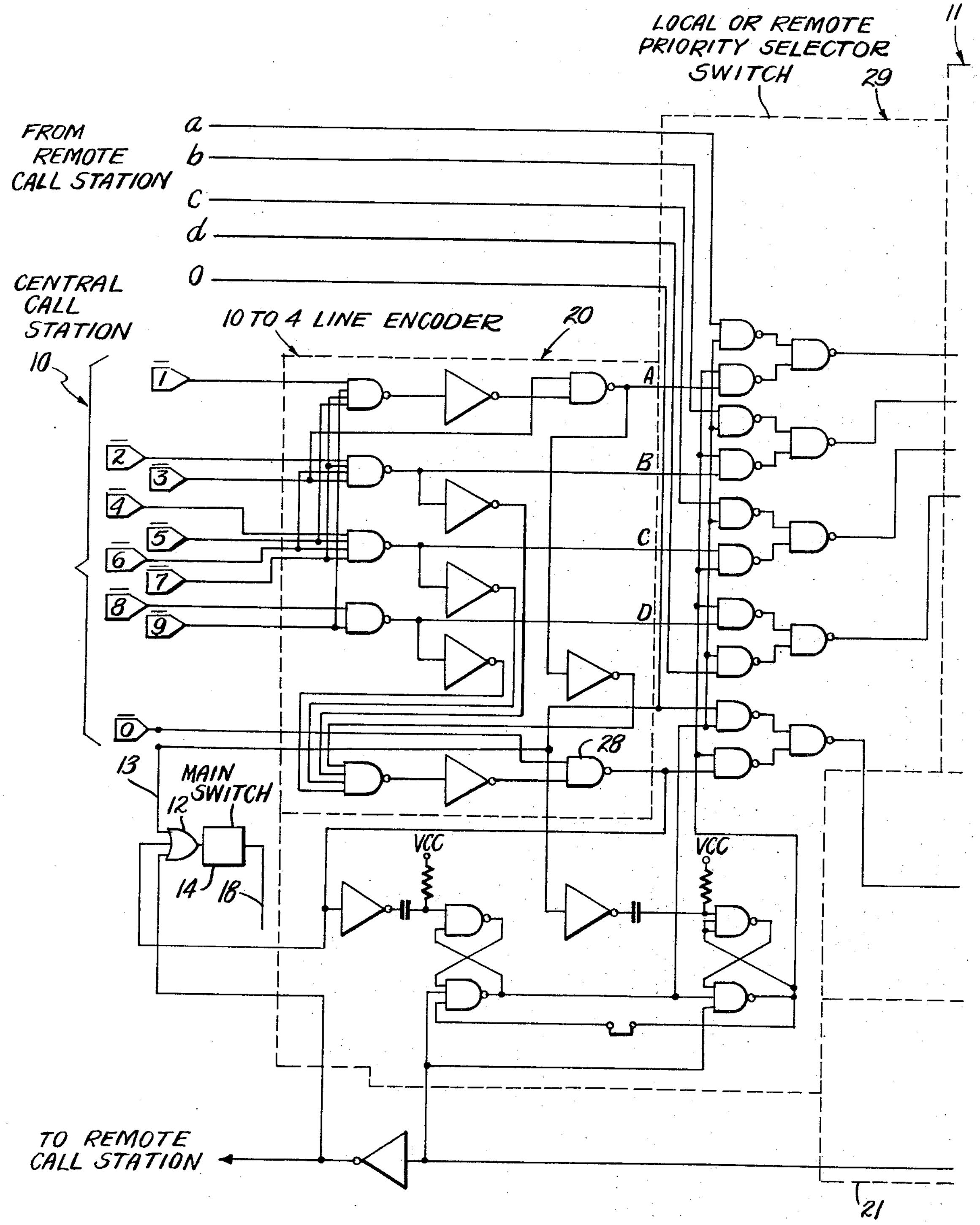
Figure 2B:
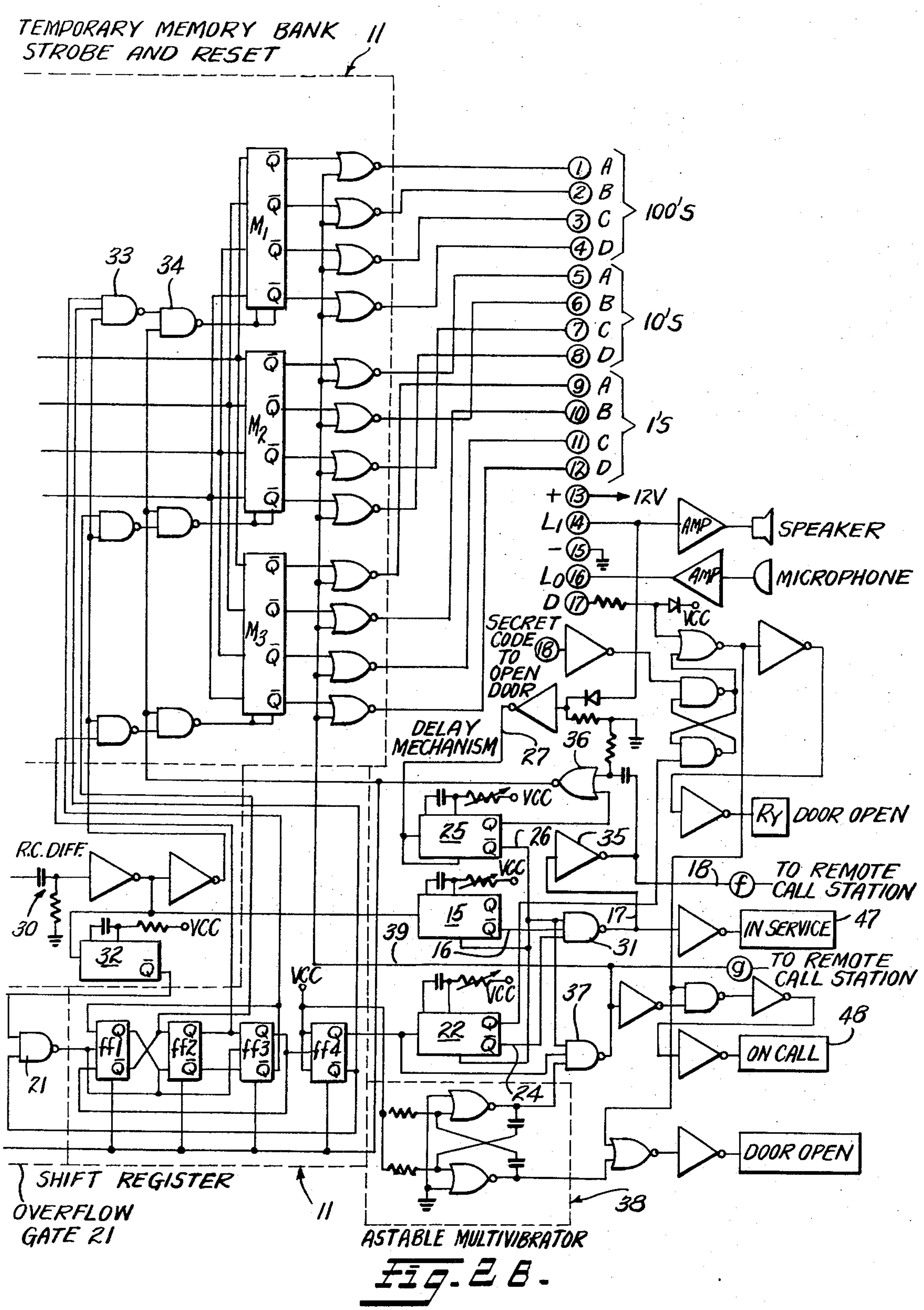

The invention will be more fully understood from a consideration of the accompanying drawings in which:

FIG. 1 is a diagrammatic view showing the invention in simplified form and FIG. 2 is a more detailed presentation showing the details of the multiple action selector and the delay circuits in greater detail. FIG. 2 is constituted by FIGS. 2A and 2B together.

The overall action in this invention is pictured in a simplified or function form in FIG. 1 where 10 identifies a central call station which is interconnected with a multiple action selector comprising a memory bank and shift register 11, and an OR gate 12.

In addition to the memory bank and the shift register, the multiple action selector will normally include an encoder for converting the decimel signals supplied by the call station 10 into binary signals which can be handled with fewer lines in the memory bank and shift register. FIG. 1 includes an encoder 20 together with an overflow gate 21. It will be understood that the encoder 20 as well as the memory bank and the shift register are all wholly conventional in telephone circuitry and these units are available in commerce and their details form no part of this invention.

The use of any of the buttons in the call station 10 sends a signal through line 13 to OR gate 12 which switches a main switch 14, which is a latching switch, from its normal standby position to a power on service position as shown. This powers all the equipment including the components of the multiple action selector. At the same time that the operation of call station 10 signals the main switch 14 to power the equipment, it also actuates delay mechanism No. 1 identified by numeral 15.

If the call is not completed in the time allocated by delay No. 1, then a signal is sent by this delay mechanism through lines 16, 17 and 18 back to main switch 14 to reset it in its standby position.

If the call is completed in the allowed time, then the shift register, in moving to its final position, generates a signal which actuates a second delay mechanism 22, and it also completes a circuit to the selected receiver through a conventional decoder 23. This circuit actuates an alarm at the selected receiver.

If the selected receiver is not answered, delay mechanism 22, after its preset time expires, generates a signal which is transmitted via lines 24, 17 and 18 to reset main switch 14 in its standby position.

If the selected receiver is answered in proper time, then this opens a line of communication between the selected receiver and the central call station. It also generates a signal which actuates a third delay mechanism 25 via line 27. If the desired communication is completed in the time preset in delay mechanism 25, then completion of the call (evidenced by the hangup of the receiver) causes the equipment to return to standby position. If, for some reason, the receiver is not hung up within the time predetermined by the delay mechanism 25, then this delay mechanism generates a signal which is transmitted via lines 26, 17 and 18 to reset main switch 14 in its standby position and thereby permit other calls to be made.

Signal lights 47 and 48 can be used in the central call station to identify the function which prevails at any given moment.

There will, of course, be lines communicating to all of the apartments which are served and these will include a door opening signal which can be operated by any of the parties who are called when they desire to release the door lock in the entrance area.

The invention is shown in greater detail in FIG. 2 where the various portions of the multiple action selector are more fully shown. In FIG. 2, the ten input lines from the call station 10 are converted to four binary lines A, B, C, and D. The four binary lines together with a zero digit line go through an NOR function gate 28 in the encoder 20 and then through a priority switch 29 and a resistor capacitor differentiator network 30 which fires the delay mechanism 15 causing it to change its state and send a signal through NOR function gate 31 which lights the "In Service" indicator. At the same time, the differentiator 30 sends out a negative pulse which fires a delay mechanism 32, the output of which goes through overflow gate 21 to operate the shift register 11.

The differentiator 30 also generates a positive pulse to strobe the memory bank. The pulse is received by NAND function gate 33, the output of which goes to NOR function gate 34 to operate the latches of the memory bank. In this way, the data from call station 10 is transferred to and stored in the memory bank 11. If the call is not completed in proper time, a reset pulse is generated by delay mechanism 15 and is transmitted through gate 31 via line 17, via inverter 35 and NOR function gate 36 to reset the shift register and the memory bank. If the system includes a remote and local priority switch 29, as when the building has a second entrance, then this switch is also reset. If the call is completed in proper time, then overflow gate 21 closes and the call is completed.

In the operation of the shift register 11, when the last flip flop (ff4) functions, a signal is generated which actuates delay 22. This also sends a signal through NAND function gate 37 which releases multivibrator 38 and activates line 39 which, via the decoder shown in FIG. 1, operates the alarm at the selected receiver. If the receiver is lifted, completing the call, this activates delay mechanism 25 which over-rides delay mechanism 22 and delay mechanism 15 and this provides a predetermined time, set on the delay mechanism 25, for the desired communication to be carried out. In security systems of the type under consideration, the desired time for identification is brief, usually from 30 seconds to a minute.

It will be observed in FIG. 2 that the receivers are not shown, and it will be understood that appropriate latch flip flops and the like are employed to provide private communication between the selected receiver and central call station.

FIG. 2 also includes ancillary equipment for door opening, and other conventional features, and these are not described in detail.

The invention is defined in the claims which follow.

I claim:

1. An automatic communications system adapted to provide security communications within an apartment building comprising, a central call station including a multiple action selector positioned in an entrance area and a plurality of telephone receivers positioned in the different apartments of said building, a main switch for shifting the communications system from its normal standby status to a service status, a first time delay circuit operative upon use of said multiple action selector to provide time for completing the desired selection before said main switch shifts back to standby status, a second time delay circuit operative upon completion of the desired selection to provide time for the selected receiver to be answered before said main switch shifts back to standby status, said second circuit including an alarm for the selected receiver, and a third time delay circuit operative upon the selected receiver being answered to discontinue the alarm and establish communication with said central call station for a time sufficient to conclude a brief conversation before said main switch shifts back to standby service permitting the central call station to be used for other calls even though the selected receiver is not hung up.

2. A communications system as recited in claim 1 in which said multiple action selector includes a memory bank and a shift register with the last flip flop in the shift register actuating said second time delay circuit.

3. A communications system as recited in claim 2 in which said multiple action selector is a decimel selector and an encoder is provided for converting the signal to a binary mode.

* * * * *